May 6, 1969   R. J. LAHR   3,442,582
LAMP ARRANGEMENT FOR DOCUMENT SCANNING AND MODIFIED LAMP
Filed Dec. 7, 1966

INVENTOR.
ROY J. LAHR
BY *John A. Brady*
ATTORNEY.

United States Patent Office 3,442,582
Patented May 6, 1969

3,442,582
LAMP ARRANGEMENT FOR DOCUMENT SCANNING AND MODIFIED LAMP
Roy J. Lahr, Penfield, N.Y., assignor to International Business Machines Corporation, Armonk, N.Y., a corporation of New York
Filed Dec. 7, 1966, Ser. No. 599,971
Int. Cl. G03b 21/28
U.S. Cl. 353—29         19 Claims

ABSTRACT OF THE DISCLOSURE

A fluorescent lamp with internal and external shielding, and having an optical path through the lamp where two apertures are left in the shielding. One aperture is positioned very close to a document to be illuminated and viewed, and a lens is positioned to view the document through the other aperture.

BACKGROUND

Documents are scanned for a number of purposes, notably to copy the document by electrostatic or other techniques and to read the document mechanically as in character recognition systems. Many different arrangements for scanning documents are known.

No prior technique is known, however, in which the light to illuminate the document can be brought very close to the document. Usually the light sources are lamps simply spaced away from the document, with or without special associated reflectors, and having sufficiently high intensity to produce the amount of light required at the document. On the other hand, the basic features of the lamp used in the preferred embodiments of this invention are known; the lamp is a modification of the lamp described in U.S. Patent 3,115,309.

This invention yields both the saving of power and the saving of space and hardware. The structures according to this invention are very compact and essentially relatively inexpensive. About half of the light generated in accordance with this invention is directed to the document without intervening structure which could dissipate power and intensity, and without the need of special light guides or reflectors.

SUMMARY

It is an object of this invention to provide an improved optical system for document scanning.

It is a further object of this invention to provide an optical system for document scanning in which power requirements are reduced.

It is another object of this invention to provide a more compact optical system for document scanning.

In accordance with this invention a lamp is provided to scan a document, the lamp having internal generation of light and two openings. One of the openings is positioned near the document and the other opening is part of an optical path to receive reflections from the document. The optical path extends through the lamp to the document.

The foregoing and other objects, features, and advantages of the invention will be apparent from the following more particular description of a preferred embodiment of the invention, as illustrated in the accompanying drawings.

Figure 1:
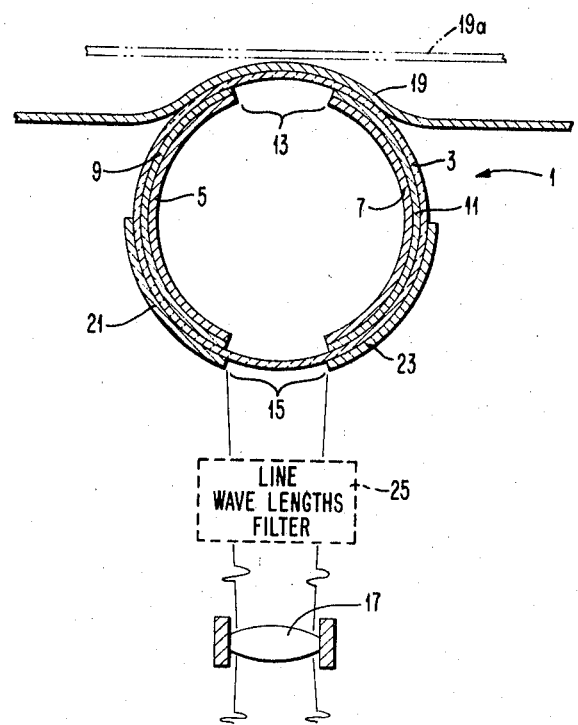
FIGURE 1 illustrates a preferred system in which a curved lamp is used.
Figure 2:
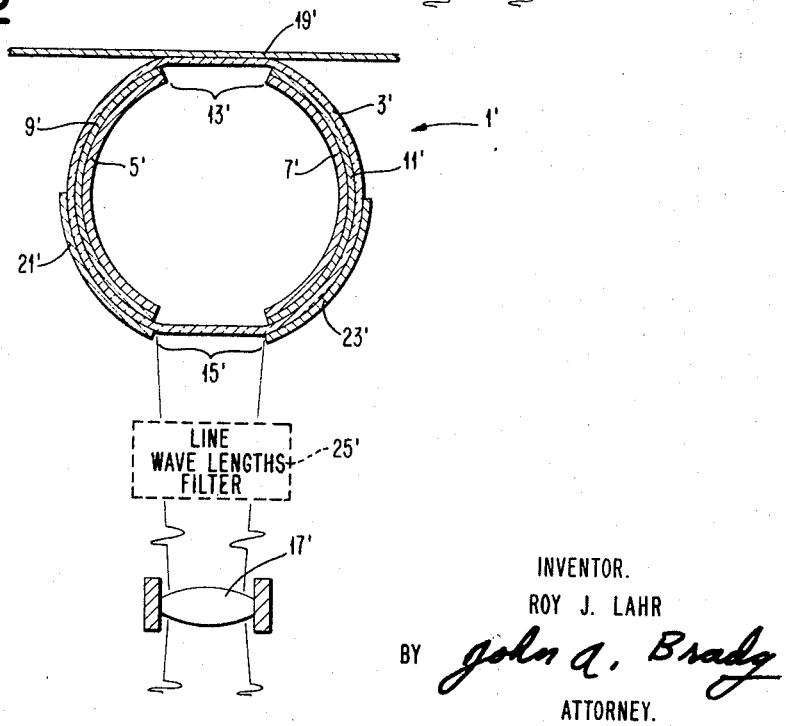
FIGURE 2 illustrates a preferred system in which flat portions on the lamp provide better optical clarity at the cost of increased expense in fabricating the lamp.

Both FIG. 1 and FIG. 2 show a lamp 1, 1' similar in basic structure and mode of operation to that described in U.S. Patent 3,115,309. On the other hand, the lamp here described differs from that of U.S. 3,115,309 in that two apertures of the lamp are oppositely situated. Also, the protection of the glass at an aperture as discussed beginning at column 1, line 59 of U.S. 3,115,309 is not by a phosphor coating unless that protective coating is such as to be ineffective to produce significant radiation. The external shielding shown in FIG. 6 of U.S. 3,115,309 is somewhat differently positioned in accordance with this invention.

Since the systems of FIG. 1 and FIG. 2 differ essentially only in the external form of the lamp, the following description will be made with reference to FIG. 1 only in most instances. It should be understood that what is said with regard to FIG. 1 is equally true with regard to FIG. 2 unless the difference is entirely apparent or is specifically mentioned. The corresponding parts of FIG. 2 will be given the same number but with a prime indication on that number.

The lamp 1 is a fluorescent lamp in which gas contained in the lamp is excited, as is conventional, by an electric current. The lamp 1 is shown in cross-section. The major structural support of the lamp 1 is a long tube of glass as is also common in fluorescent lamps, the side view shown in the drawings being relatively small as compared to the length of the lamp 1. Gas inside the lamp 1, when electrically excited, produces high frequency electromagnetic radiation. This radiation is of such high frequency that it does not substantially constitute illumination in the usual sense. Also, the inside of the lamp 1 is otherwise empty. Therefore, lamp 1 constitutes a light source in which a substantially optically unobstructed and substantially unilluminated path may be found through the light source.

The major structural component in the lamp 1 is the glass tube 3. Inside the glass tube 3 are two arc-shaped layers 5, 7, of fluorescent material which have an unobstructed side facing the inside of lamp 1. Immediately beneath and coextensive with the fluorescent layers 5, 7 are two arc-shaped layers 9, 11 of reflective material. The reflective material layers 9, 11 may be composed of a layer containing powdered metal oxides or may be composed of other suitable material.

The arc-shaped layers 5, 7, 9, and 11 are located on substantially all of the inside of the length of lamp 1, except where two apertures are defined. The apertures will be denominated the scan apertures 13 and the viewing aperture 15. The apertures 13 and 15 are on diametrically opposite sides of lamp 1. A lens 17 is situated at a distance spaced from viewing aperture 15 to receive an image reflected through scan aperture 13 and to direct this image to any suitable utilization means.

With reference to FIG. 1, the document 19 may be conformed to the curved surface for purposes of scanning as illustrated with document 19 shown in solid outline. Also with reference to FIG. 1 the document may be held horizontal as shown in dotted outline in FIG. 1 (the document here being denominated as 19A). The horizontal position of the document 19A as shown in FIG. 1 would be used in a "flat-bed" optical system for a copier. Regardless of whether the document 19 is pressed to the curve of lamp 1 in FIG. 1 or held horizontal as shown in dotted outline in FIG. 1, the glass tube 3 is curved within the optical path of the image reflected from the document to the lens 17. This curved glass normally will introduce some distortion into the image.

The system shown in FIG. 2 is essentially similar to that of FIG. 1, but is designed to eliminate the distortion from curved glass just mentioned. The glass tube 3' in FIG. 2 is flattened at both the apertures 13' and 15', thereby theoretically eliminating distortion caused by curved glass existing in the optical system. Production of the lamp 1' having flat apertures as required in the device illustrated in FIG. 2 would add somewhat to the cost of the lamp. The curved shape could be achieved by heating the lamp while holding the lamp between shaped graphite blocks. This post-forming technique is similar in some respects to techniques presently used with the same kind of lamp to make "twisted" and "grooved" lamps.

During operation of the lamp 1, gas inside the lamp emits high frequency electromagnetic radiation. Most of this is of higher frequency than the frequencies useful with the optical system of which lens 17 is a part. The fluorescent layers 5 and 7, of course, transform the high frequency radiation to electromagnetic radiation within the range of lower, useful frequencies. The reflecting layers 9 and 11 prevent the escape of light from the sides for the purpose of directing as much light as possible to the scan aperture 13.

It is desired that as much light as possible be directed toward the scan aperture 13. On the other hand, it is desired that the lamp itself direct no light to the lens 17 since the lens 17 should only receive light reflected through the scan aperture 13. To implement this, the fluorescent side layers 5 and 7 and their associated reflectors 9 and 11 are continuous and extend to about the sides of the scan aperture 13 and the viewing aperture 15. In fact, the layers just mentioned define the sides of the scan aperture 13, but the viewing aperture 15 can be thought of as being foreshortened somewhat by shields 21 and 23 which are on the outside of the lamp.

Light from fluorescent side layers 5 and 7 is reflected randomly within the lamp where that light impinges upon reflective layers 9 and 11, and ultimately, either by direct propagation or through reflection, the light will impinge upon both apertures 13 and 15. This directs a large amount of light through scan aperture 13 to the document 19, and this light is reflected back from document 19. Similarly, a large amount of light arrives at viewing apreture 15, but it arrives at an angle so extreme that it will not be received by lens 17. Stated more specifically, the lens 17 is set back far enough so that no direct path exists from layers 5, 7, 9 and 11, which are the sources of light, through aperture 15 to lens 17.

The reflective layers 9 and 11 are not perfectly reflective. Therefore, the bottom parts of the lamp which are in a direct optical path to lens 17 are shielded by material such as heavy metal or other light absorptive coatings 21 and 23. Coatings 21 and 23 cover substantially all of the bottom half of light 1, with the exception, of course, of viewing aperture 15. This shielding extends slightly past the fluorescent layers 5 and 7 and their associated reflective layers 9 and 11 so as to effectively close aperture 15 sufficiently so that light cannot find a direct path from layers 5, 7, 9, or 11 through viewing aperture 15 to lens 17.

With shielding layers 21 and 23 blocking all light which otherwise would be emitted somewhat from the side of the lamp, lens 17 sees darkness except for those images which are transmitted through viewing aperture 15. Of course, lens 17 is not normally structured to accept light except that coming in a direction from the area of aperture 15. However, stray light from the sides of lamp 1 could be reflected to thereby enter lens in a direction at which the light would be accepted by lens 17. Therefore, the shielding coatings 21 and 23 are desirable.

In use the lamp is simply powered up to a state of light generation while the document is as close as reasonably convenient and possible to scanning aperture 13. The document is illuminated by light which is generated within the lamp and the lens 17 views the document automatically, there being no need to move lens 17 or otherwise cause some additional action to ocur. Of course, when the documnet is relatively long, means will be provided to create a relative movement between the document 19 and the lamp and optical system associated with the lamp.

In an actual test using the structures as shown in FIG. 1, the lamp 1 was one with a 3⅛ inch outside diameter. The scanning aperture was approximately 1 inch and the viewing aperture was just less than ⅞ inch. The overcovering of coatings 21 and 23 to thereby close viewing aperture 15 slightly was about ⅛ inch, that is, coatings 21 and 23 each extended about ⅛ inch past fluorescent coatings 5 and 7, and coatings 5 and 7 were therefore separated about 1⅛ inch at viewing aperture 15. A marked increase in the coupling of light was found as compared with the use of the single lamp as a source spaced to the side to illuminate the document. The amount of light as measured in foot-candles reflected from the document more than doubled.

Very little need be said concerning the compact and efficient arrangement of the structures in accordance with this invention. Only one light is used and a minimum of space is occupied by that one light since the light is positioned directly in the optical path from the document. The space savings yielded permit the lamp used to be a larger one capable of producing more intense radiation, if more illumination is desirable in a particular system.

Of course, the amount of background light is increased and the contrast is accordingly reduced when the gases inside the lamp 1 generate electromagnetic radiation of frequencies which are accepted by the optical system in which lens 17 is a part. In a typical lamp, for 100 watts electrical input, about 2 watts of directly produced gas discharge radiation occurs in these frequency ranges, while over 20 watts of radiation in the usable frequency range is produced by the phosphor layers. The radiation which is produced by the gas and is in the usable range is nonetheless high frequency radiation. Also, that radiation is in the form of line or narrow space band radiations. Much of this background radiation, which is undesirable, can be reduced if the particular application renders desirable the reduction or elimination of that radiation. This can be achieved by simply filtering the image viewed through viewing aperture 15. The filter would be one specific to certain frequencies or bands. Specifically, interference filtering at the line wave lengths produced by the gas could be employed. Since this is an optional feature, it is shown in dotted outline in the drawings; in FIG. 1 the wave lengths filter is numbered 25.

While the invention has been shown and described with reference to preferred embodiments thereof, it will be understood by those skilled in the art that the foregoing and other changes in form and details may be made therein without departing from the spirit and scope of the invention.

I claim:

1. A document viewing and illuminating system having a light source and optical means to transmit the image reflected from the document wherein the improvement comprises:

said light source being one in which a substantially optically unobstructed and substantially unilluminated path may be found through said light source, two apertures in said light source to transmit radiation from said light source, and image directing means in an optical path which includes said two apertures.

2. The system as in claim 1 in which said two apertures are positioned on substantially diametrically opposite sides of said light source.

3. The system as in claim 1 in which said light source has a glass member as the major structural support and said glass member is substantially flat at at least one of said apertures.

4. The system as in claim 1 in which said light source is a fluorescent lamp.

5. The system as in claim 2 in which said light source has a glass member as the major structural support and said glass member is substantially flat at at least one of said apertures.

6. The system as in claim 4 in which said light source has a glass member as the major structural support and said glass member is substantially flat at at least one of said apertures.

7. The system as in claim 2 in which said light source is a fluorescent lamp having at least one fluorescent layer in an effective amount situated over a reflective layer, said fluorescent layer having a substantially unobstructed side facing the inside of said lamp, both said fluorescent layer and said reflective layer being on substantially all of the length of the inside of said lamp except in the general areas defining said apertures.

8. The system as in claim 7 in which said light source has a glass member as the major structural support and said glass member is substantially flat at at least one of said apertures.

9. The system as in claim 1 also including a filter for at least some radiation of frequency different from the frequency of most illumination produced by said light source, said filter being situated in said optical path between at least one of said apertures and said image directing means.

10. The system as in claim 4 also including a filter for at least some radiation of frequency different from the frequency of most illumination produced by said fluorescent lamp, said filter being situated in said optical path between at least one of said apertures and said image directing means.

11. The system as in claim 8 also including a filter for at least some radiation of frequency higher than the frequency of most illumination produced by said fluorescent lamp, said filter being situated in said optical path between at least one of said apertures and said image directing means.

12. A fluorescent lamp having an effective amount of fluorescent material at substantial portions of the length of said lamp, but not in the general areas defining at least two apertures positioned on substantially diametrically opposite sides of said lamp, said two substantially diametrically opposed apertures providing a substantially optically unobstructed path through said lamp, said lamp being specially adapted for use in a document scanning system.

13. The lamp as in claim 12 also including light shielding material on the outside of said lamp covering at least the area near opposing sides of one of said aptreures, said shielding material extending at least slightly past said fluorescent material to shorten said one aperture.

14. The lamp as in claim 12 in which said lamp has a glass member as the major structural support and said glass member is substantially flat at both said apertures.

15. The lamp as in claim 13 in which said lamp has a glass member as the major structural support and said glass member is substantially flat at both said apertures.

16. The lamp as in claim 12 in which said fluorescent material is at substantially all of the length of said lamp except in the general areas defining two said apertures.

17. The lamp as in claim 13 in which said fluorescent material is at substantially all of the length of said lamp except in the general areas defining two said apertures.

18. The lamp as in claim 14 in which said fluorescent material is at substantially all of the length of said lamp except in the general areas defining two said apertures.

19. The lamp as in claim 15 in which said fluorescent material is at substantially all of the length of said lamp except in the general areas defining two said apertures.

References Cited
UNITED STATES PATENTS

| 3,205,394 | 9/1965 | Ray | 313—109 |
| 3,225,241 | 12/1965 | Spencer et al. | 313—109 |
| 3,275,872 | 9/1966 | Chernin et al. | 313—109 |
| 3,379,917 | 4/1968 | Menelly | 313—109 |

NORTON ANSHER, *Primary Examiner.*

RICHARD A. WINTERCORN, *Assistant Examiner.*

U.S. Cl. X.R.

313—109